US012579654B2

(12) United States Patent
Flanagan et al.

(10) Patent No.: US 12,579,654 B2
(45) Date of Patent: Mar. 17, 2026

(54) INTERFACE DETECTION IN RECIPROCAL SPACE

(71) Applicant: FEI Company, Hillsboro, OR (US)

(72) Inventors: John Francis Flanagan, Hillsboro, OR (US); Christopher John Hakala, Hillsboro, OR (US); Lucas Winiarski, Portland, OR (US)

(73) Assignee: FEI Company, Hillsboro, OR (US)

( * ) Notice: Subject to any disclaimer, the term of this patent is extended or adjusted under 35 U.S.C. 154(b) by 378 days.

(21) Appl. No.: 18/226,050

(22) Filed: Jul. 25, 2023

(65) Prior Publication Data

US 2025/0037286 A1     Jan. 30, 2025

(51) Int. Cl.
G06T 7/13 (2017.01)
G01N 23/04 (2018.01)
(Continued)

(52) U.S. Cl.
CPC .............. G06T 7/13 (2017.01); G01N 23/04 (2013.01); G01N 23/20058 (2013.01);
(Continued)

(58) Field of Classification Search
CPC ... G06T 7/13; G06T 7/73; G06T 2207/10056; G06T 2207/30148; G06T 2207/10061; G06T 7/0004; G01N 23/04; G01N 23/20058; G01N 23/20; G01N 23/225; G01N 2223/401; G01N 2223/417;
(Continued)

(56) References Cited

U.S. PATENT DOCUMENTS 11,513,079 B2 *   11/2022   Alvis ................... G01N 23/203
2021/0381992 A1 *   12/2021   Aguiar ............... G01N 23/2251
(Continued)

FOREIGN PATENT DOCUMENTS

CN          116912215 A  * 10/2023   ........... G06T 7/0004

OTHER PUBLICATIONS

Amidi et al., "Convolutional Neural Networks Cheatsheet," downloaded from https://stanford.edu/~shervine/teaching/cs-230/cheatsheet-convolutional-neural-networks#cheatsheet on Jun. 22, 2023, pp. 1-14.
(Continued)

*Primary Examiner* — Stephen R Koziol
*Assistant Examiner* — Michael Kim Maiden
(74) *Attorney, Agent, or Firm* — Klarquist Sparkman, LLP

(57) ABSTRACT

Methods and apparatus determine a location of a boundary of a given material in a sample, based on classification of reciprocal space images at respective positions. A diffraction image at a given position is classified to identify a material at that position. Imaging and classification at multiple positions can quickly and reliably find the boundary with sub-micron accuracy. Binary search provides speed-up. Classification is performed by neural network. The technique is suitable for distinguishing monocrystalline, polycrystalline, and amorphous silicon, high-Z materials (tungsten), or low-Z materials (carbon), among others. The technique integrates into automated workflows, with precise positioning of further imaging, probing, or milling operations based on the located boundary. Examples and variations are disclosed.

22 Claims, 7 Drawing Sheets

(51) Int. Cl.

| | |
|---|---|
| *G01N 23/20058* | (2018.01) |
| *G06T 7/73* | (2017.01) |
| *G06V 10/82* | (2022.01) |
| *G06V 20/69* | (2022.01) |

(52) U.S. Cl.
CPC ................ *G06T 7/73* (2017.01); *G06V 10/82* (2022.01); *G06V 20/693* (2022.01); *G06V 20/695* (2022.01); *G06V 20/698* (2022.01); *G06T 2207/10056* (2013.01); *G06T 2207/30148* (2013.01)

(58) Field of Classification Search
CPC ........... G01N 2223/6116; G06V 10/82; G06V 20/695; G06V 20/698; G06V 10/143; G06V 10/25; G06V 10/44
See application file for complete search history.

(56) References Cited

U.S. PATENT DOCUMENTS

| | | | |
|---|---|---|---|
| 2022/0128493 A1* | 4/2022 | Miller | G01N 23/20058 |
| 2022/0181117 A1* | 6/2022 | Barnum | H01J 37/28 |
| 2023/0004749 A1* | 1/2023 | Jaganathan | G06N 3/0455 |

OTHER PUBLICATIONS

Reith et al. "Comparing pattern sensitivity of a convolutional neural network with an ideal observer and support vector machine," available from https://www.researchgate.net/publication/337208775_Comparing_pattern_sensitivity_of_a_convolutional_neural_network_with_an_ideal_observer_and_support_vector_machine, pp. 1-21 (Nov. 2019).

* cited by examiner

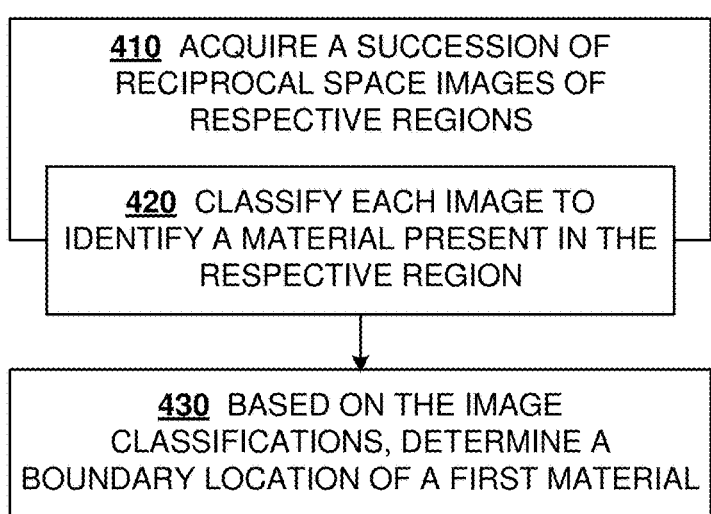

410 ACQUIRE A SUCCESSION OF RECIPROCAL SPACE IMAGES OF RESPECTIVE REGIONS

420 CLASSIFY EACH IMAGE TO IDENTIFY A MATERIAL PRESENT IN THE RESPECTIVE REGION

430 BASED ON THE IMAGE CLASSIFICATIONS, DETERMINE A BOUNDARY LOCATION OF A FIRST MATERIAL

FIG. 4

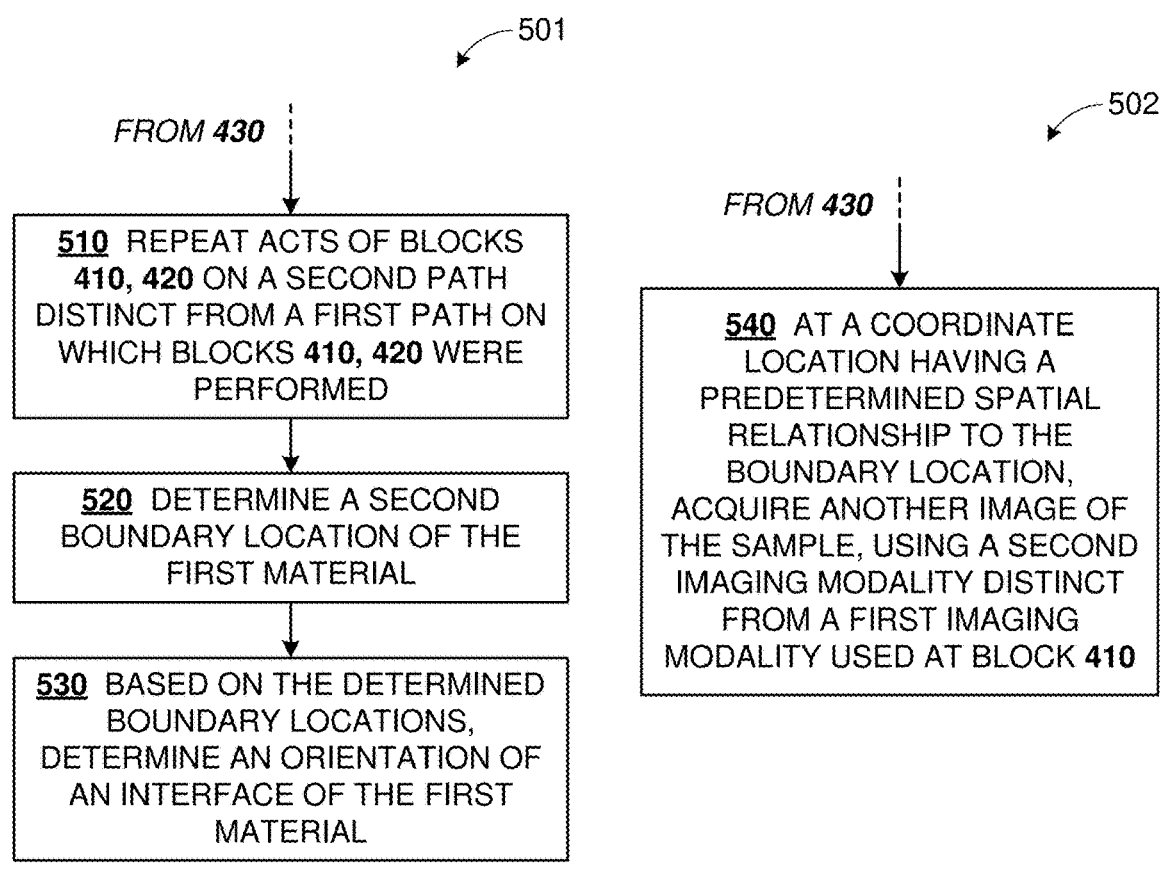

—501

FROM 430

510 REPEAT ACTS OF BLOCKS 410, 420 ON A SECOND PATH DISTINCT FROM A FIRST PATH ON WHICH BLOCKS 410, 420 WERE PERFORMED

520 DETERMINE A SECOND BOUNDARY LOCATION OF THE FIRST MATERIAL

530 BASED ON THE DETERMINED BOUNDARY LOCATIONS, DETERMINE AN ORIENTATION OF AN INTERFACE OF THE FIRST MATERIAL

—502

FROM 430

540 AT A COORDINATE LOCATION HAVING A PREDETERMINED SPATIAL RELATIONSHIP TO THE BOUNDARY LOCATION, ACQUIRE ANOTHER IMAGE OF THE SAMPLE, USING A SECOND IMAGING MODALITY DISTINCT FROM A FIRST IMAGING MODALITY USED AT BLOCK 410

Computing Cloud
890

Software 880
for described
technologies

Computing Environment 810

820

822
Processing
Unit

824
Memory

Communication
Port(s)    870

Input Device(s)
850

Output Device(s)
860

Graphics or Co-processor
830

Storage
840

Software 880 for
described
technologies

881 Imager
Control

882 Mill
Control

883 Stage
Control

884 Neural
Network

885
Metrology

886 Other
Software

880

INTERFACE DETECTION IN RECIPROCAL SPACE

BACKGROUND

Interface detection is a valuable component of sample analysis in the semiconductor industry. Objects of interest often lie on or near a boundary between two materials. Examples include blanket films or semiconductor structures built atop bulk silicon. Conventional techniques include manual inspection of a survey image, or machine vision techniques for e.g. edge detection. The former approach is naturally unsuited to workflow automation, while the latter technique can be ad hoc and in some situations error-prone. In the first place, an imaging modality is required where the desired interface is visible as an edge or other discontinuity, which can require recurring research efforts as new materials or device types are introduced. Particularly, an analysis program may require detection of multiple interfaces between different pairs of materials. Finding a one-size-fits-all imaging modality can be challenging for certain samples. Then, machine vision techniques can do a good job finding an edge, but can stumble on identifying which edge is the desired edge. Heuristics to select the correct edge can vary considerably from sample to sample, requiring a great deal of effort for configuration and testing, often by trial-and-error. Accordingly, there remains a need for a robust, versatile, and automated technique for locating material boundaries in semiconductor and other samples.

SUMMARY

In brief, examples of the disclosed technologies use analysis of reciprocal space images to classify materials in respective imaged regions. By scanning over a succession of imaged regions, e.g. in stepwise fashion or by binary search, the location of a transition (boundary) from one material to another material can be determined, quickly and reliably, to an accuracy of 100 nm or better.

A reciprocal space image can be obtained directly, e.g. by a diffractometer, or indirectly, e.g. by taking a physical space image and applying a transform. Each reciprocal space image can be classified, e.g. by a neural network, to identify a material present at the imaged region. Based on the classifying, over multiple imaged regions, a boundary location of a given material can be determined.

The disclosed technologies can be implemented as an apparatus comprising an imager, configured to acquire a plurality of images of respective regions of a sample, and a controller. The controller can be configured to process a reciprocal space representation of each image and, responsive to the processing, classify a material within the respective region among a predetermined plurality of materials. The controller can be configured to determine a coordinate location of a boundary of a first material of the plurality of materials.

The foregoing and other objects, features, and advantages of the invention will become more apparent from the following detailed description, which proceeds with reference to the accompanying figures.

BRIEF DESCRIPTION OF THE DRAWINGS

FIG. 4 is a flowchart depicting a first example method according to the disclosed technologies.

FIGS. 5A-5B are flowcharts depicting example extensions of methods according to the disclosed technologies.

DETAILED DESCRIPTION

Introduction

Figure 1:
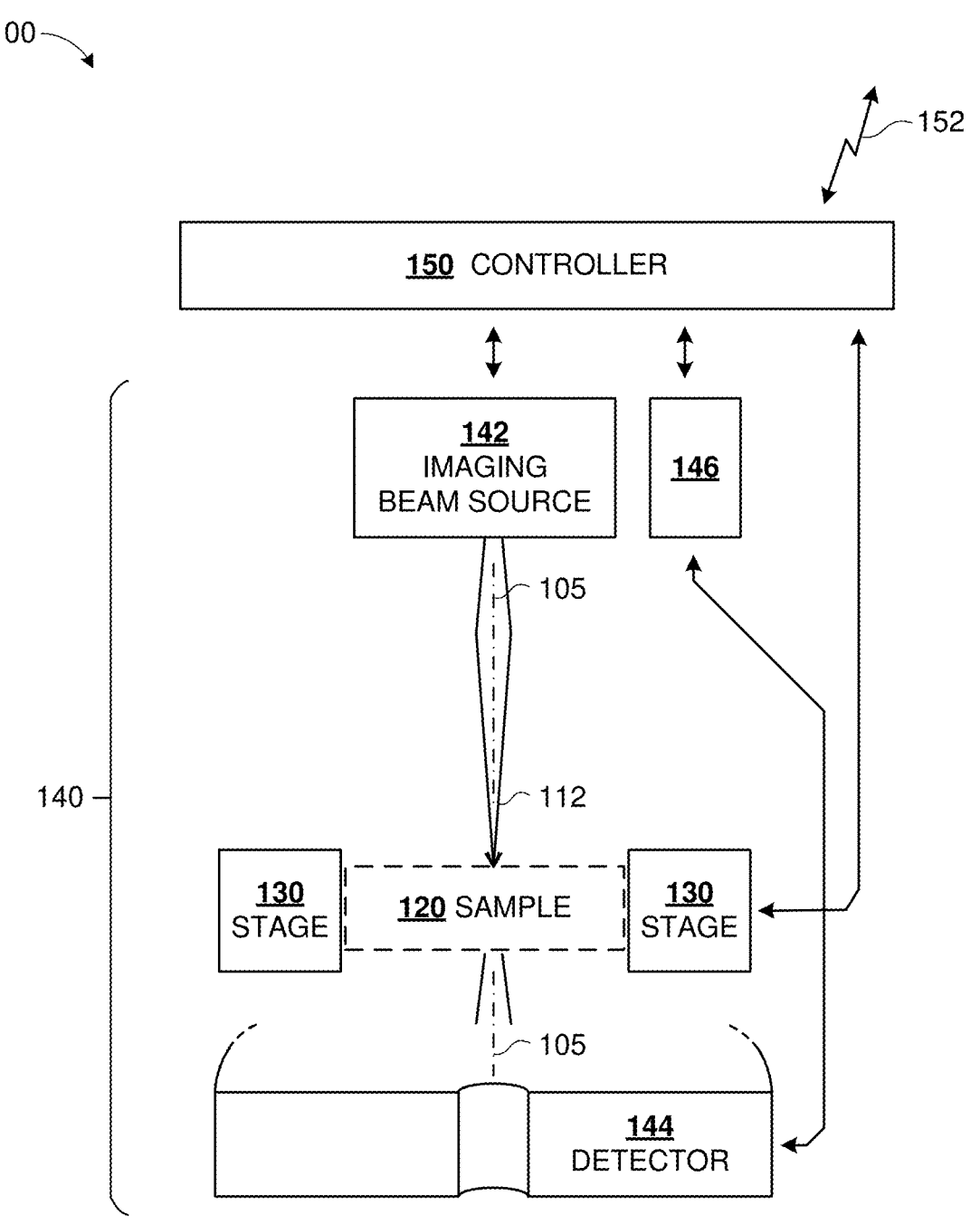
FIG. 1 is a diagram of an example apparatus with which the disclosed technologies can be implemented.

Automated analysis of semiconductor and other samples relies on registration of an analysis tool with sample features, which are often material boundaries or at predetermined offsets from such boundaries. Conventional techniques can be ad hoc techniques to find material boundaries. An imaging modality suitable for one type of boundary may not be suitable for another. As samples and compositions vary, a great deal of trial and error can sometimes be required to find one or more suitable imaging modalities to capture all material boundaries of interest. Machine vision techniques, e.g. for edge detection, can also be easily fooled on certain samples, rejecting a desired edge in favor of an artifact. A machine vision algorithm that works effectively on one sample type can have a high failure rate when a change is made to the sample.

The disclosed technologies rely on reciprocal space images, such as diffraction patterns, which can directly provide material characterization, without relying on skilled operators or fragile machine vision heuristics. In some examples, tools such as convergent beam electron diffraction (CBED) can operate with spot sizes under 10 nm, affording very precise mapping of materials in a sample. A scan of multiple spots along a path can readily identify where a transition from one material to another occurs. The disclosed technologies can detect changes in a CBED image which are indicative of a change in the underlying imaged material, for example a change from a CBED that is characteristic of monocrystalline silicon to a CBED that is not. Further, a binary search along the path can find the transition in logarithmic time, meaning that the time taken is linearly dependent on the logarithm of the required tolerance. Still further, multiple scans can be used identify orientation of a boundary, trace a boundary having complex shape, or identify multiple boundaries between respective material pairs within a single session.

Terminology

The usage and meaning of all quoted terms in this section applies throughout this disclosure unless clearly indicated otherwise or repugnant to the context. The terminology below extends to related word forms.

"Analysis" refers to operations used for characterizing a sample, and can include material removal, other sample preparation, imaging, probe measurements, non-contact measurements, or secondary evaluation of data obtained by any of these techniques. Analysis operations can include imaging (e.g. FIB, optical, or electron microscopy), etching (e.g. ion milling), delayering, electron backscatter analysis, electron microscopy, mass spectrometry, material analysis, metrology, nanoprobing, spectroscopy, or surface preparation. Equipment or instrumentation for performing such operations is referred to as an "analytic instrument", "analyzer", or "tool". Non-limiting examples of tools which can be used in conjunction with the disclosed technologies include mills, etchers, electron microscopes, electron spectrometers, optical microscopes, or optical spectrometers. Particularly, some tools of interest herein incorporate a plasma focused ion beam (PFIB), scanning electron microscope (SEM), or fluorescence microscope.

A "beam" is a directional flow of particles or energy. Common beams of interest in this disclosure are particle beams, such as electron beams or ion beams (including plasma focused ion beams); or an optical beam, such as a laser beam for fluorescence excitation. A beam can have finite extent transverse to its principal longitudinal direction of flow. A line joining the centroids of two or more transverse cross-sections of a beam is an "axis" of the beam.

A "binary search" is a one-dimensional search technique in which a discontinuity can be accurately found in logarithmic time by successive bisection of an interval spanning the discontinuity. To illustrate for a boundary between carbon and silicon, if images at coordinate positions 0 $\mu$m and 64 $\mu$m reveal materials carbon ("C") and silicon ("Si") respectively, then initially, the C—Si boundary can be specified as 32±32 $\mu$m. If a next image taken at 32 $\mu$m is determined as C, the boundary determination can be improved to 48±16 $\mu$m. Successive images can reveal 48 $\mu$m=Si, 40 $\mu$m=Si, 36 $\mu$m=C, 38 $\mu$m=Si, so that five measurements can improve the boundary determination from 32±32 $\mu$m to 37±1 $\mu$m. The number of measurements (5) is equal to the logarithm (to base 2) of the improvement in accuracy (32).

A "boundary" is an interface between two regions having differences in composition, structure, or orientation of respective constituent materials. As one illustration, a boundary can separate a silicon region from a carbon or tungsten region. As another illustration, a boundary can separate a region of monocrystalline silicon from a region of amorphous silicon. As a further illustration, a boundary can separate two grains of polycrystalline silicon, having different orientations. As used herein, determining a boundary can be understood as short-hand for determining a coordinate location of one or more points on the boundary. A boundary can be interface between two distinct materials (such as mono-Si and amorphous Si), or internal within a single material, such as between two grains of poly-Si.

"Classify" and "classification" refer to an act of assigning an item to one among a finite predetermined set of choices. In some examples of interest herein, the classified item can be an imaged region of a sample, and each of the choices can be a respective material. In varying examples, classification can be performed by trained machine learning software, by other automated software, or by a user (e.g. using interactive software). A software program performing classification is termed a "classifier".

A "controller" is an electronic device coupled to one or more actuators to effect a change in a physical parameter, or coupled to one or more sensors to monitor a physical parameter. Some controllers can include a microprocessor which can be programmed to execute machine readable instructions. The descriptions herein of computing devices are generally applicable to such controllers, which can also include additional electronic circuitry such as filters and amplifiers. Other controllers can include analog circuitry such as filters and amplifiers without any microprocessors.

A "convergent beam electron diffractometer" ("CBED") is an analyzer configured to perform electron diffraction analysis of a sample using a convergent electron beam. The convergent beam can provide a narrower beam spot (commonly having diameter in a range 1-100 nm, or 0.3-300 nm) than a parallel beam (commonly at least 500 nm) for improved spatial resolution. The convergent beam can form a cone having half-width of about 0.1-1°, which can manifest as broadening of observed features in reciprocal space, e.g. conventional electron diffraction spots appearing broadened as disks. In some examples, a CBED can project a diffraction pattern of electrons onto a fluorescent screen which can be imaged with a CCD camera. Other detectors and readouts can also be used.

A "coordinate location" numerically specifies a position of an associated entity in physical space, with each of one or more coordinates indicating how far in a respective dimension the position lies. A coordinate can be one-dimensional along a straight or curved line, two-dimensional along a plane or curved surface, or three-dimensional. The coordinates can include a mix of distance and angle coordinates (e.g. in a polar, cylindrical, or spherical coordinate system), or only distance coordinates (e.g. in a Cartesian coordinate system). A coordinate location of a point on a boundary is a "boundary location."

An "electron beam" is a directional flow of electrons.

An "electron microscope" is an analyzer in which a sample is illuminated by an electron beam, and resulting particles or electromagnetic radiation are used to form a spatially resolved direct image. A scanning electron microscope (SEM) images a sample surface based on reflected, secondary, or backscattered particles or radiation from one or more surfaces of the sample. Because beam interactions detected by a SEM occur at or near this surface, a SEM can operate on samples of arbitrary thickness. In contrast, a transmission electron microscope (TEM) images a sample volume based on transmitted electrons (including scattered electrons). A TEM operates on samples of about 10-150 nm thickness, which can be mounted on a grid for mechanical support and thermal conductivity. A TEM can provide magnifications up to and exceeding 50 million (and resolution below 5 pm), while SEM magnifications are usually limited to about 2 million (with resolutions down to about 0.5 nm). In this disclosure, a scanning transmission electron microscope (STEM), which performs imaging of transmitted electrons using a scanned electron beam, is considered to be both a SEM and a TEM. The electron beam in an electron microscope can be generated in an electron gun, and accelerated, focused, or steered through a series of stages toward a sample chamber.

A "feature" is a structure or other variation that is discernible in an image of a sample. In a direct image, features can include structures or material boundaries, such as a component of a memory cell, a transistor, a grain boundary, or an interface between a bulk substrate layer and another layer. In reciprocal space, exemplary features can include moire patterns, Kikuchi lines, central spots, or haloes. Reciprocal space features can provide clues as to composition, structure, or orientation of material in an imaged region of the sample, and changes in these features from one region to the next can serve to determine material boundaries. A "moire pattern" is a repetitive oscillation in image intensity sometimes associated with interference received e.g. from two sources or scatterers. A "Kikuchi line" is a bright band in an electron diffraction pattern associated with a lattice plane of an imaged sample. The location and orientation of a Kikuchi line are dependent on tilt and azimuthal orientation of the associated lattice plane, relative to an incident electron beam. Reciprocal images can also have a "central spot" which is a bounded bright zone, and a surrounding "halo" which is an annular region having observable intensity (per pixel) at least a factor or two lower than a peak intensity of the central spot. Central spots are often circular or near-circular (e.g. having a ratio of major diameter to minimum diameter in a range 1 to 2), and are often in the center of the reciprocal image (e.g. aligned with an axis of an incident beam), but these are not requirements and, in other examples, a central spot can be off-center or elongated. Features can exhibit "symmetry" in either direct or reciprocal images, meaning that a single feature or a group of features in unchanged upon either (1) a finite rotation less than 360° about an axis (dubbed an "axis of symmetry"), or (2) reflection in a plane (dubbed a "plane of symmetry"). Axes and planes of symmetry can be considered to extend orthogonally from the image plane.

The term "imaging" refers to a process for obtaining a two-dimensional representation (dubbed an "image") of a parameter value over a region of interest of a sample. In some examples, the imaged parameter can be backscatter or secondary emission from an incident particle beam (e.g. by SEM or low-current focused ion beam), but this is not a requirement, and visible light or other parameters can also be imaged. In disclosed examples, the image can indicate objects on or in the sample (e.g. gates, layers, metallization, or vias) or features (e.g. edges) of such objects.

An "imager" (sometimes, "imaging tool") is an apparatus capable of imaging. Some imagers can use response (e.g. beam current, secondary emission, backscatter, or fluorescence) to an incident beam as a measured parameter from which an image is formed. An imager that acquires or provides a direct image of a target sample is termed a "microscope". A microscope using an incident electron beam or ion beam can be termed an "electron microscope" (e.g. SEM, STEM, or TEM) or "ion microscope" (e.g. FIB) respectively. An imager in which the measured parameter includes intensity, wavelength, or another property of light can be termed an "optical microscope." Some optical microscopes use an incident optical beam (e.g. for fluorescence) but this is not a requirement, and other beams, or diffuse or ambient illumination can also be used. Other imagers can acquire or provide a reciprocal space image of a sample, and can include diffractometers such as CBED or an X-ray diffractometer. The term "charged particle imager" encompasses electron microscopes, ion microscopes, and CBED. Various detectors can be used to measure particle or radiation emanated from the imaged sample, including secondary electron detectors, secondary ion detectors, photodetectors, or spectrometers. The technique used to obtain an image is termed an "imaging modality". Thus, scanning electron microscopy, transmission electron microscopy, and convergent beam electron diffraction are distinct modalities respectively utilized by SEM, STEM, TEM, and CBED tools. In some examples, a same beam column can be used for multiple imaging modalities. In further examples an analyzer can include multiple beam columns, such as respective columns for an electron beam, an ion beam, or a laser beam.

"Material" refers to a characterization of the matter present in a region of a sample. The characterization can include composition, e.g. silicon, silicon dioxide, and carbon are three distinct materials. The characterization can also include structure, e.g. carbon can have hexagonal or cubic structure in graphite and diamond respectively. Silicon can have monocrystalline, polycrystalline, or amorphous form. "Polycrystalline" silicon ("poly-Si") can be organized as grains (typically 2-500 nm in extent) having regular crystal structure within each grain, with a change in orientation (or another discontinuity) between adjacent grains. In this disclosure, matter in two regions is considered to be a same material if composition and structure are the same, even if orientation is different. Thus, adjacent grains of polycrystalline silicon are considered to be a same material. Moreover, a material can have an internal boundary, e.g. where there is a discontinuity in its structure, such as at a grain boundary. "Amorphous" silicon lacks a regular structure: the orientation of Si—Si bonds 1 nm or farther apart can be uncorrelated. "Monocrystalline" silicon ("mono-Si") has uniform crystalline structure over 1 µm-30 cm in a plane, but can be adjacent to a layer containing amorphous or polycrystalline silicon. Some materials of interest herein can have a composition characterized by atomic number. The atomic number of silicon is 14. Elements such as tungsten having atomic number greater than or equal to 15 can be regarded as "high-Z" materials, while elements such as carbon having atomic number less than or equal to 13 can be regarded as "low-Z" materials. In further examples, the structure of a material can encompass the physical layout of devices or components on or within the sample. For example, a memory array can have a particular regular structure distinct from the organization of an adjacent logic or processor block. Thus, the memory array and the logic or processor block can be considered distinct materials, which can readily be distinguished in reciprocal space (e.g. in a transform of a direct image)—the memory array having sharp spectral peaks according to its regular layout, and the logic or processor block having diffuse spectral density.

A "neural network" is an artificial network of "units" (or "cells") that has linkages modeled on behavior of biological neurons and can be implemented by a software program on a computer. Common neural networks can be organized as layers—at each layer, an input array of data is operated on to generate an output array. Some neural networks described herein are "convolutional neural networks" (CNN) in which at least one layer convolves multiple segments of an input array with one or more common kernels to generate the corresponding output array. In examples, disclosed technologies can be implemented on a residual CNN (ResNet). A neural network has a structure, e.g. layers, neuron types, and operations or paths leading from input to output array at each layer; and also has arrays of coefficient or weight data to be applied at each neuron or operation. Examples of the disclosed technologies apply neural networks for classification of e.g. material in an imaged sample region.

A "parameter" is a quantity that can have a particular "value". While parameters often have numerical values, this is not a requirement, and some parameter values can be logical values, strings, or data structures. Some parameters can be control parameters, e.g. set by a controller to affect a physical device or physical operation. Other parameters can be sensed parameters, e.g. determined by a physical environment and measured or evaluated (e.g. to form an image or from an image) by a controller or measuring apparatus.

"Physical space" refers to a two- or three-dimensional region in which a sample is tangibly present. The sample has length, width, and thickness (or alternative extents) in the physical space. An image in which extent or spacing of features is proportional to their extent or spacing in the physical space is termed a "direct image." To illustrate, a visible light camera or a microscope can form a direct image of a sample.

"Reciprocal space" refers to a two- or three-dimensional extent in which coordinate values are proportional to spatial frequencies in physical space. To illustrate, consider spatially periodic feature A having a wavelength twice that of another spatially periodic feature B. In reciprocal space, feature A can have a coordinate position half that of feature B. An image in reciprocal space is termed a "reciprocal image." A diffraction tool such as CBED can generate a reciprocal image directly from a sample. Reciprocal images can also be obtained by transforming a direct image, e.g. by FFT. For example, the transformed image can be sensitive to texture of an imaged surface, or can allow materials to be identified or distinguished based on spectral content.

A "region" is a contiguous two-dimension portion of a sample surface, or a contiguous three-dimensional portion of the sample volume.

A "region of interest" (ROI) is a portion of a sample that includes a feature or structure that is the subject of subsequent analysis. An ROI can be defined with respect to a surface of the sample (e.g. a region of an imaged surface containing a particular feature, or a region in which patterns can be milled to form a lamella containing such feature) or with respect to a volume (e.g. a volume containing a structure to be analyzed further). The term ROI does not refer to any human interest. A region can be a region of interest, however some regions may lack specific features or structures and may not be regions of interest.

A "sample" is a physical object upon which imaging, milling, or other analytic or manufacturing procedures are performed. Common samples can incorporate biological samples, multi-layer electrical or electronic structures, or other material structures. Electrical or electronic samples can include semiconductor devices such as logic gates, memory cells, optoelectronic devices, passive components (including interconnect), transistors, and can be in various stages of manufacture or disassembly. Material samples can include microelectromechanical systems (MEMS) or nano-structures. Biological samples can include cells, proteins, DNA, RNA, viruses, or fragments thereof. Disclosed techniques can be applied during sample preparation, characterization of the sample, or during manufacture. A sample can include a "substrate" upon which cells, structures, or devices are deposited or fabricated prior to lamella preparation or other analysis.

A "scan" is a traversal by an imager over a sample, e.g. taking a succession of images at respective locations. The imager can scan imaged locations on a predetermined path. In some examples, successive imaged locations can be "in order," meaning that a coordinate value of the imaged position is changed monotonically over the scan. To illustrate, a coordinate of an imaged position can be incremented in 200 nm steps for each successive image. In other examples, a binary search can advantageously be used, so that a coordinate location of a boundary is quickly narrowed down to a predetermined tolerance. Although scans are commonly one-dimensional, being performed along a straight or curved path, this is not a requirement, and two-dimensional scans can also be used, e.g. to map out a complex boundary profile. Still further, a discrete set of one-dimensional scans can be used, in different directions, or offset from one another, in any combination.

A "semiconductor device" is a device incorporating one or more semiconductor regions (e.g. doped or undoped silicon, germanium, III-V semiconductors, or similar materials). A "manufactured semiconductor device" can be a finished product (e.g. one which can perform its intended electronic function when appropriate electrical signals are applied), a portion thereof, or a product at an intermediate stage of manufacture (e.g. one upon which at least one patterning operation has been performed). Semiconductor devices commonly include other materials to provide insulation or conducting paths between semiconductor regions. Non-limiting examples of semiconductor devices include transistors, memory cells, and some optoelectronic devices. Memory interface circuits can include both conductive wiring and logic gates.

"Software" refers to computer-executable programs, instructions, or associated data structures. Software can be in active or quiescent states. In an active state, software can be loaded into memory, or can be undergoing execution by one or more processors. In a quiescent state, software can be stored on computer-readable media, awaiting transmission or execution. An "instruction" (or "program instruction") encodes an operation (sometimes, together with one or more operands, operand addresses, or destination addresses) to be performed by a processor. A group of instructions can be organized to perform a function. "Interactive software" refers to software programs that present information to a user and receive commands from the user in response to the presented information. "Automated software" refers to software programs that receive information from equipment or from other software programs, and select one or more actions to be performed by equipment or other software programs, without user input.

A "tolerance" is a predetermined limit on an acceptable deviation between a reported value of a parameter and its true value. In some examples, material boundaries can be determined to a 100 nm tolerance, meaning that the reported boundary coordinate location is within 100 nm of the exact location of the boundary. Tolerances can range from 1 nm to 10 mm.

The terms "top," "bottom," "up," "down," "above," "below," "horizontal," "vertical," and the like are used for convenience, with respect to a common configuration in which an exposed major surface of a horizontal sample has an outward normal directed upward, e.g. the sample is accessible to process tools from above. An axis of a process tool (e.g. view axis of an imaging tool or a beam axis of a FIB mill) can be approximately normal downward onto the surface, or can be tilted at an angle (sometimes in a range 40°-60°) relative to the normal. One of ordinary skill will understand from this disclosure that a choice of actual orientation can be varied without departing from the scope of the disclosed technologies.

"Training" refers to a process of determining values (coefficients) to be applied at neurons of a neural network, and can render a neural network operable for its desired functionality. Training can be performed using a training data set comprising images for which a desired classification is already known. Comparison of actual output of a trainee neural network with the desired classification can provide a loss function, which can be propagated backward through the neural network, applying gradient descent or another established technique to tune the coefficients at each layer. As training proceeds, the neural network outputs can converge to the desired classifications, and the magnitude of the loss function can decrease. When the loss function has decreased to below a predetermined threshold, the neural network can be regarded as "trained" and can be deployed to classify new images for which the correct classification may not be known.

"Transform" refers to an act of converting a direct image (or, direct space data) into a reciprocal image (or, reciprocal space data), or vice versa. Transforming can be done by software (e.g. using a fast Fourier transform (FFT) or a wavelet transform) or can be done physically by an imager. To illustrate, a CBED can transform a physical structure into a reciprocal space image.

A "user" is a person. Exemplary users can control analytic procedures or equipment, or can receive a presentation of data or a notification from such analytic equipment. Users can interact with equipment, samples, or software with the help of communication networks, computer input or output interfaces, or client software.

Example Apparatus

FIG. 1 is a diagram 100 of an example apparatus with which the disclosed technologies can be implemented. The apparatus delivers an imaging beam onto a sample to obtain an image, which can be classified by the controller. The imaging beam can be scanned relative to the sample surface to determine a boundary between a first material and another material.

Imager 140 can include a beam source 142, a detector 144, and a readout 146. Imaging beam source 142 can be configured to direct incident beam 112 along axis 105 to sample 120. Beam 112 can be scanned over sample 120 to obtain a succession of images at respective locations on sample 120. Sample 120 can be secured on stage 130. Detector 144 can be configured to detect scattered particles by sample 120. Signals representing the particles can be measured by readout 146.

In examples, the imager can be a SEM, STEM, TEM, or CBED, but this is not a requirement, and another microscope or diffractometer can also be used. As illustrated, beam 112 is convergent, as might be used in a CBED, but this is not a requirement, and a parallel beam can be used. A divergent beam can also be used, e.g. to increase the illuminated region of the sample. As illustrated, detector 144 can be a segmented annular detector, as can be found in a diffractometer, but this is not a requirement and, in other examples, one or more discrete sensors can be used, such as Everhart Thornley detectors, microchannel plates, or Faraday cups. Readout 146 can include one or more amplifiers and/or ammeters. Scanning of beam 112 over sample 120 can be performed by steering beam 112, translating stage 130, or a combination thereof.

Controller 150 can be coupled directly or indirectly to imager beam source 142, stage 130, readout 146, or detector 144. Thereby, controller 150 can control and acquire images from imager 140, and cause scanning of beam 112 relative to sample 120. Controller 150 can also process images received from imager 140 to classify a material within an imaged region of sample 120, e.g. among a predetermined set of materials. In some examples, imager 140 can directly provide reciprocal images to controller 150 while, in other examples, imager 140 can provide a direct image to controller 150, which can be transformed into a reciprocal space representation by controller 150 prior to classification. Based on material classification at a succession of imaged regions of sample 120, controller 150 can determine a coordinate location of a boundary of a first material in sample 120.

Numerous extensions or variations of the illustrated apparatus can be implemented within the scope of the disclosed technologies. In examples, imager 140 can be a direct space imager (such as SEM, STEM, TEM, or FIB) or a reciprocal space imager, such as a CBED. The illustrated apparatus can also support a second imaging modality, for example another electron microscopy modality, FIB, or fluorescence imaging.

Controller 150 can be configured to acquire another image of sample 120 using the second imaging modality. This image can be acquired at a second coordinate location having a predetermined spatial relationship relative to the coordinate location of the boundary. In some examples, beam 112 can be used for both imaging modalities, while in other examples, the two imaging modalities can be provided in a dual-beam tool. Detector 146 can be a pixelated electron diffraction detector having at least 100 pixels (and up to 1 billion pixels). Current received at each pixel of detector 146 can be accumulated as a charge at each pixel and the pixel charges can be read out sequentially using pixel array readout electronics 146.

In some examples, controller 150 can be configured to identify a boundary of monocrystalline silicon, e.g. an interface between a monocrystalline bulk layer, and one or more other materials such as amorphous silicon, polycrystalline silicon, tungsten or another high-Z material, or carbon or another low-Z material. In some examples, controller 150 can be configured to perform binary classification, e.g. (1) a given first material or (2) not the given first material while, in other examples, controller 150 can be configured to classify an image as indicating any among three or more materials.

Controller 150 can perform classification using a convolutional neural network. Controller 150 can be configured to scan beam 112 over sample 120 at locations spaced closely enough to establish the boundary location to within a predetermined tolerance. The tolerance can be about 100 nm, or in a range 10-50 nm, 50-200 nm, or 200 nm-1 μm.

Controller 150 can have a wired or wireless network interface for connection 152 with a remote computer or control station.

Example Principle

Figure 2:
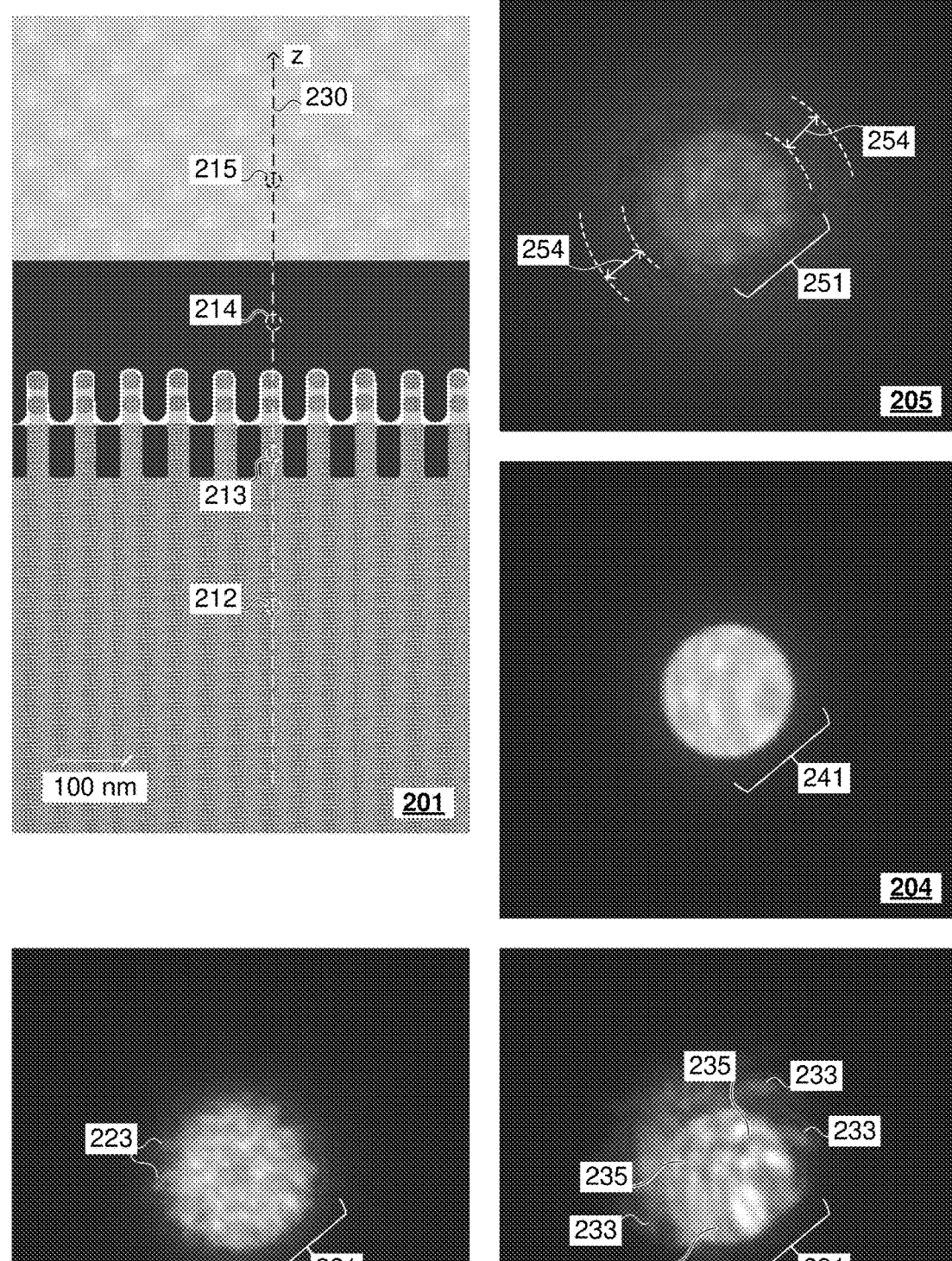
FIG. 2 is a set of images illustrating an application of the disclosed technologies.

FIG. 2 is a set of images 201-205 illustrating a principle of operation of examples of the disclosed technologies. Image 201 is a rendition of a high-angle annular dark-field (HAADF) STEM image of a sample, a direct image formed from high-angle forward scattered electrons. CBED images 202-205 are taken at respective regions 212-215 of the sample, and have features characteristic of the material in the sample region.

Starting with image 202, a bright central spot 221 can be seen, with speckle but otherwise generally uniform intensity. While no significant halo is present, some regular Kikuchi lines 223 can be seen flaring out from core 221. These features can be characteristic of a regular crystalline structure having symmetry about an axis of an incident beam (similar to axis 105 of FIG. 1), where strong diffraction from principal planes enhances visibility of the Kikuchi lines outside the core, and there are no irregular variations to wash out the speckle. Such features can be associated with e.g. monocrystalline silicon of a bulk layer.

Turning to image 203, a bright central spot 231 can be seen, with Kikuchi line features 233 (bright), 235 (dark) both within central spot 231 and extending significantly beyond. The image can be seen to have significant asymmetry. Such features can be characteristic of a regular crystalline structure lacking strong symmetry about the incident beam axis, which can arise through tilt of either beam or crystal lattice. Image 203 can also be associated with monocrystalline silicon.

Image 204 shows a bright central spot 241 with only modest intensity variations and no significant intensity outside central spot 241. Such features indicate low scattering, and can be associated with a low-Z amorphous material such as carbon.

Image 205 shows a central spot 251 having low intensity and some speckle, surrounded by a noticeable symmetric diffuse halo 254. The low intensity and speckle are indicative of mixing of diffraction from crystalline grains having different orientations, e.g. a polycrystalline material. (CBED spot size can often be smaller than a grain dimension: signal mixing can occur between grains at the sample surface and differently oriented grains buried underneath.) The halo can be a result of strong scattering from a high-Z material. Image 205 can be associated with tungsten.

Images 202-205 illustrate how varying materials in regions 212-215 can result in noticeably different features in a reciprocal space representation such as a diffraction pattern. These images are merely exemplary: other feature can be used in addition to or alternatively to the features described, to identify a wide range of materials. In some examples, CBED can be advantageous due to its small spot size. A material can be accurately identified from a very small region of a sample surface, and material boundaries can be determined with very high resolution in a range 10-20 nm, 20-50 nm, 50-100 nm, or 100-200 nm. Additionally, an artificial neural network can be trained to perform such material identification with a high degree of accuracy, providing better than 90%, 95%, 98%, or 99% correct material identification in varying applications. Automated, precise boundary identification can enable workflow automation, the boundary identification providing registration of the sample in a field of view of e.g. a STEM analyzer, with which high resolution TEM imaging, probing, or milling can be performed at precise locations without manual assistance.

Example Applications and Binary Search

Figure 3:
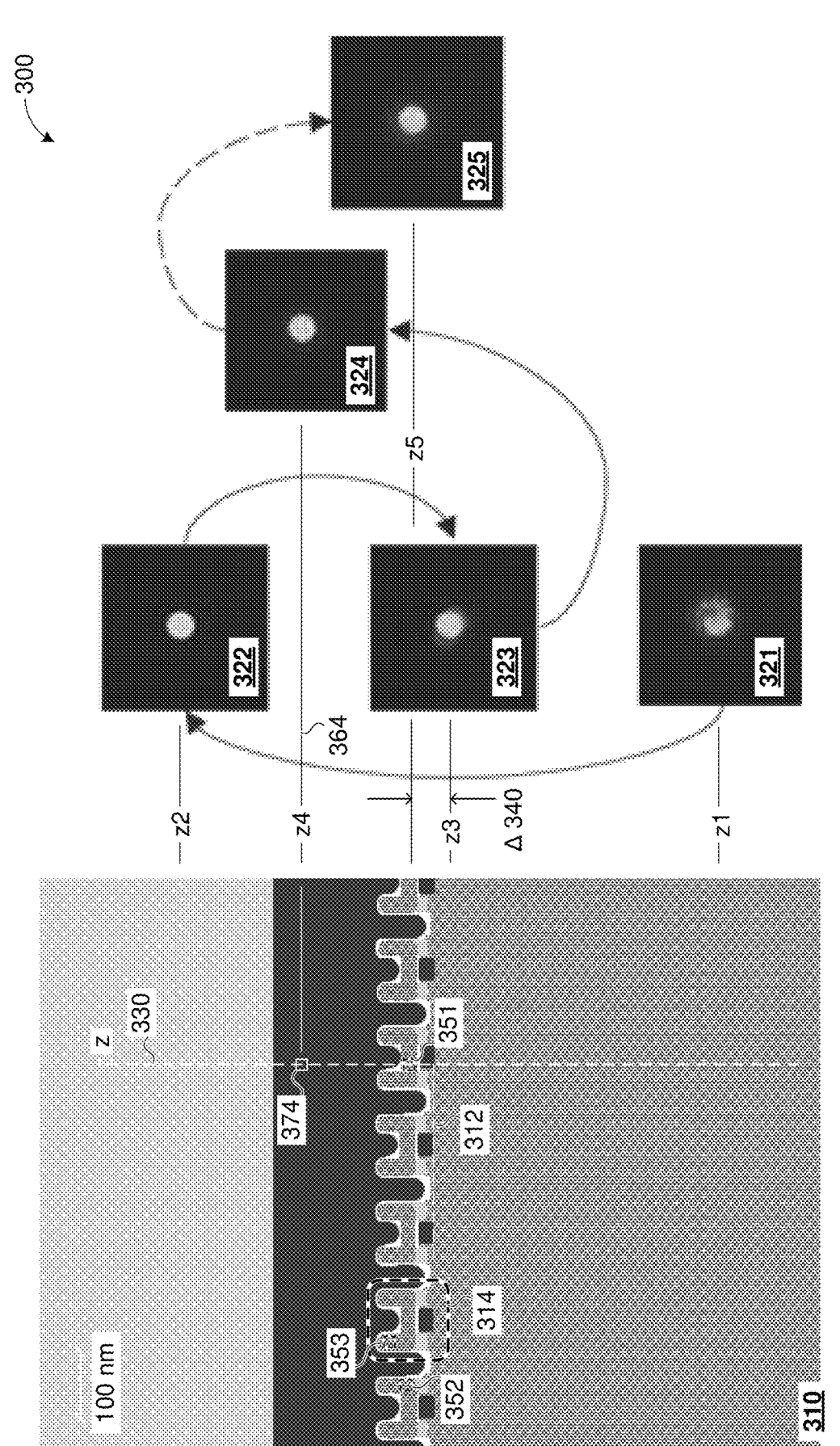
FIG. 3 is a diagram illustrating the use of binary search in examples of the disclosed technologies.

FIG. 3 is a diagram 300 illustrating the use of binary search in examples of the disclosed technologies. Images are acquired and processed at a succession of regions to narrow down a coordinate location of a boundary to within a predetermined tolerance.

1. Disclosed Technologies Provide Advantages

Image 310 is rendition of a high-angle annular dark-field (HAADF) STEM image of a sample with fins. Some bright lines in image 310 can be STEM artifacts indicative of edges, while others can indicate a high-Z buffer layer. Image 310 shows a relatively simple structure of a semiconductor device, which nonetheless has many such bright lines of varying thickness, orientation, and length. In an automated workflow, it can be desirable to find a coordinate location of edge 312. Comparative machine vision techniques can be fooled by other edges in image 310, leading to low reliability (e.g. below a predetermined threshold, which can be in a range 50-89%), and are therefore unsuitable for an automated workflow. In contrast, the disclosed technologies are not fooled by STEM artifacts, permitting edge 312 to be reliably determined. That is, the disclosed technologies can determine a coordinate location of edge 312 within a predetermined tolerance and with a probability greater than a predetermined threshold. The predetermined tolerance can be in a range 1 nm-10 μm, 10 nm-1 μm, 30-300 nm, or about 100 nm. The predetermined threshold can be in a range 90-99.999%, e.g. about 90%, 95%, 98%, 99%, or 99.9%.

While image 310 shows a relatively simple structure of a semiconductor device, the disclosed technologies can be applied to considerably more complex samples, providing reliable automated determinations of boundary locations.

2. Applications in Automated Workflow

Image 310 depicts a row of gate devices 314 formed above edge 312. In an example application, a high-resolution TEM image or another analysis procedure can be performed at a predetermined offset from edge 312, based on a coordinate location of edge 312 determined using the disclosed technologies. That is, once edge 312 has been found, layers above edge 312 can be reliably analyzed and characterized. To illustrate, if a z-coordinate of edge 312 has been found along path 330, then subsequent analysis can be reliably performed at a desired offset along path 330, e.g. at region 351.

In another application, two coordinate locations of edge 312 can be determined based on two scans, to determine the orientation of edge 312, allowing reliable positioning of subsequent analysis regions (e.g. region 352) that are away from path 330.

In a further application, multiple boundary locations can be determined along respective paths and between respective materials, for example to determine the outline of gate 314. Thereafter, one or more regions can be precisely selected relative to the outline of gate 314 for subsequent analysis, such as at region 353.

3. Speed-Up by Binary Search

Turning back to edge 312, the right side of FIG. 3 illustrates determining a coordinate location of edge 312 along path 330. Reciprocal space images are obtained at a succession of positions along path 330. Representative images 321-325 are illustrated. Each image 321-325 is positioned in the z-direction according to the corresponding imaged position. To illustrate, lead line 364 points to region 374 where image 324 was acquired, and is labeled with the corresponding z-coordinate "z4". Similar lead-lines indicate the z-positions and imaged regions (not marked in FIG. 3) for images 321-323, 325.

Initially, images 321, 322 at two relatively distant positions z1, z2 can be acquired and classified as disclosed herein. As illustrated, images 321, 322 are CBED images and can be classified directly. The different features of images 321, 322 leads to their having different classification, thereby bracketing the sought location of edge 312 as being in the interval (z1, z2). Then, image 323 can be acquired and classified at a location $z3=(z1+z2)/2$. Its features can result in a classification matching that of image 321, thereby indicating that edge 312 can be found within the narrowed interval (z3, z2). A fourth image 324 can be acquired at $z4=(z3+z2)/2$. Classification of image 324 is different from that of image 321, although it may or may not be the same classification as image 322. Thus, the location of edge 312 can be further narrowed to (z3, z4).

Thus far, the interval bracketing edge 312 has remained larger than a predetermined threshold, say T=100 nm. Accordingly, the bisection continues and eventually reciprocal image 325 can be acquired and can also be classified differently from image 321. Now, the interval (z3, z5) containing a coordinate location of edge 312 has a span $\Delta=|z5-z3|<T$. Because the span $\Delta$ is less than the threshold T, the binary search method can stop. A coordinate $z=(z3+z5)/2$ can be returned as the location of edge 312, within a tolerance $\Delta/2$.

Example Method

FIG. 4 is a flowchart 400 depicting a first example method according to the disclosed technologies. In this method, reciprocal space images at a succession of sample locations are acquired and classified to identify a boundary location of a first material.

At process block 410, a succession of reciprocal space images can be acquired for respective regions of a sample. To illustrate, the images can be electron diffraction images from successive locations on the sample surface. At block 420, each image can be classified to identify a material present within the respective regions, from among a predetermined set of materials. Then, at block 430, based on the classifications, a boundary location of a first material can be determined.

Numerous variations and extensions can be implemented within the scope of disclosed technologies. For example, in FIG. 4, blocks 410, 420 are illustrated overlapping to indicate that classification can begin before image acquisition has completed. Particularly, images can be classified as they are acquired, and the classifications can be used to guide selection of subsequently imaged regions. The classifying at block 420 can be performed independently for each of the images. The classifying can be based on presence or absence of a moire pattern, presence or absence of Kikuchi lines, intensity of a central spot, absolute or relative intensity of a halo, or symmetry of one or more features of an instant reciprocal image. The classifying can be based on spectral properties detected in a transform of a direct image. The sample can be a manufactured semiconductor device. The first material can be monocrystalline silicon, often used as a bulk substrate of a semiconductor device.

In examples, the succession of images can be acquired at block 410 using binary search over a predetermined path. Initially, with two imaged locations on opposite sides of a sought boundary, a third image can be acquired at a position situated along the predetermined path and in between the two imaged locations. This can be repeated for additional images, a next image being acquired at a location situated between a most recent imaged location and another preceding imaged location. Because, at any iteration, the two previously imaged locations can be on opposite sides of the sought boundary, the next image can narrow the interval containing the desired boundary, and the binary search can be iterated to converge on the desired boundary location to within a predetermined tolerance. In some examples, the boundary location can be confirmed by taking two additional images along the predetermined path, on opposite sides of the determined boundary location, and classifying these additional images to confirm that exactly one of the two images indicates presence of the first material.

Further extensions and variations are described in context of FIG. 1 or FIG. 5, or elsewhere herein.

Example Method Extensions

FIGS. 5A-5B are flowcharts 501-502 depicting example extensions of the first method.

The extension of FIG. 5A continues from block 430 and illustrates the use of two scans to determine an orientation of an interface between two materials. In examples, the images acquired at block 410 of FIG. 4 can be acquired by scanning along a first predetermined path. At process block 510, the acts of blocks 410 (acquiring) and 420 (classifying) can be repeated for a second set of images acquired on a second predetermined path distinct from the first path. Accordingly, a second boundary location of the first material can be determined along the second path at block 520. Then at block 530, the two boundary locations determined at blocks 430, 520 can be used to determine an orientation of an interface of the first material. For example, a straight line joining the first and second boundary locations (or, a normal to this line) can indicate the interface orientation.

In alternative examples, still further scans can be performed to identify further boundary locations, and with a plurality of such boundary locations, a boundary of the first material can be traced, for any boundary shape.

The extension of FIG. 5B also continues from block 430 and illustrates the application of the disclosed technologies in an automated workflow. As an illustration, a workflow objective can be to acquire a TEM image at a precise location (say, offset by 200 nm) relative to a top surface of bulk monocrystalline material. In this workflow, the method of FIG. 4 can be used to locate the boundary between monocrystalline and polycrystalline material, using a first imaging modality (e.g. SEM, STEM, or CBED). Subsequently, a TEM beam can be accurately positioned at the desired offset from this boundary, and the desired TEM image can be acquired. In variations, the workflow objective can be to perform FIB milling or electrical probing at a precise location relative to the boundary.

At block 540, another image of the sample can be acquired at a coordinate location having a predetermined spatial relationship to the boundary location determined at block 430, using a second imaging modality different from the first imaging modality. In examples, the second imaging modality can be transmission electron microscopy.

As a further extension, multiple boundary locations or boundaries can be determined by repeating the method of FIG. 4 or FIG. 5A, and the coordinate location at which the second imaging modality is performed can be set relative to the multiple boundary locations or boundaries. In some examples, a common beam column can be used for both imaging modalities.

Example Neural Network

Figure 6:
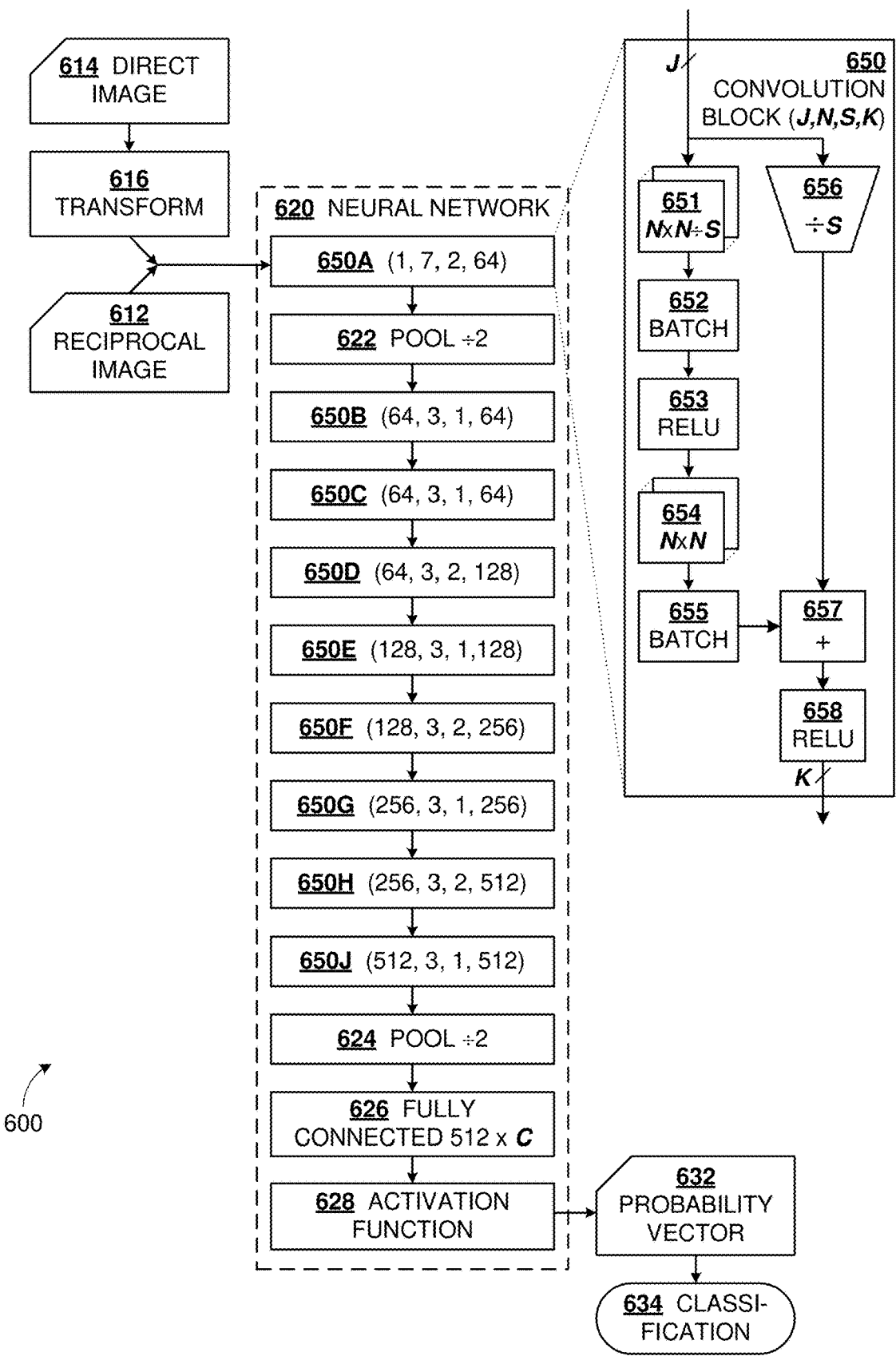
FIG. 6 is a diagram illustrating an example neural network which can be used to implement the disclosed technologies.

FIG. 6 is a diagram 600 illustrating an example neural network which can be used to implement the disclosed technologies. As illustrated, neural network 620 receives a reciprocal space representation of an imaged region at the top left of FIG. 6, and outputs a classification of a material in the imaged region at the lower right.

The description starts from the input images. In varying examples, the disclosed technologies can be implemented with imagers generating reciprocal space or physical space images. In the former case, a reciprocal image 612 can be input directly to neural network 620 as shown. In the latter case, direct image 614 can be transformed (e.g. by FFT) at process block 616 to generate a reciprocal space representation of the imaged region, which can then be input to neural network 620 as shown.

Neural network 620 is illustrated as a residual neural network ("ResNet"), which is a deep neural network having multiple convolutional layers with bypassing skip connections. A ResNet can be structured to reshape a wide, shallow representation of input data space into a narrow, deep representation of output data space. As data flows through the neural network, the data space can evolve from a representation of an image to a representation of classifications. Nevertheless, for convenience of description, data arrays throughout the neural network are described as arrays of pixels herein.

In examples, the input data space can be a reciprocal space image of a sample region, similar to one of images 202-205 of FIG. 2. To illustrate, input data size can be a 1024×1024 array of pixel intensities, and there can be just 1 slice of this size because the image data is monochromatic. Accordingly, the input data size can be 1024×1024×1. In variations, RGB color data can be used, having three slices, in which case the input data size could be 1024×1024×3. These image array sizes are exemplary. Slice sizes from 64×64 to 4096×4096 are common, and other smaller, larger or differently shaped slices can be used. Particularly, slice dimensions need not be equal, and need not be powers of 2.

A. Convolutional Block 650

As illustrated, neural network 620 contains multiple instances of convolutional block 650, labeled 650A-650J, and several other layers. At the top right of FIG. 6, block 650 is shown in parametric form, with J input slices (often termed "batches" in the art), K output slices, N×N convolution, and downsampling by a factor S. Block 650 receives J slices of a data array, copies of which are processed in parallel along two paths.

The left side of block 650 depicts a convolutional path. At block 651, N×N convolutional operators are applied across each slice of input data array, and there can be up to K×J such N×N matrices to cover all combinations of the J input slices and the K output slices. Additionally ÷S downsampling can be performed at block 651. For example, ÷2 downsampling can reduce a 1024×1024 data slice to 512× 512, which can compensate for an increase in number of slices as data flows down neural network 620. For S=1, no downsampling is performed, and a given slice of input data retains its size after processing. Then, at block 652, batch normalization can be performed across the K slices output from block 651, followed by a rectified linear unit layer (RelU) at block 653, which can introduce non-linearity into the transfer functions of block 650 or neural network 620. The output of block 653 can be input to another bank of N×N convolutional filters at block 654, which can be K×K in number, followed by another batch normalization stage 655. For input data organized as J slices, each having R rows and C columns, the output of batch block 655 can be K slices of (R/S)×(C/S) arrays.

The right side of block 650 depicts a skip path which bypasses the convolutional path. At block 656, ÷S downsampling can be performed on input data array slices, so that the sizes of each array slice received at block 657 are the same from both paths. Then, data arrays from both paths can be added at block 657, and the sum passed through another RelU layer at block 658.

B. Neural Network 620

Returning to neural network 620, the first block 650A is an instance of convolutional block 650 having J=1 input slice, 7×7 convolution, ÷2 downsampling, and K=64 output slices. The next block 622 is a pooling layer, which can perform ÷2 downsampling. This pooling layer can use a Max pooling function, so that each output pixel has the maximum value among the corresponding four-pixel (2×2) group in the input array. Block 622 is followed by two identical instances 650B-650C of block 650, each performing 3×3 convolutions and no downsampling, with 64 input slices and 64 output slices. The next two blocks 650D-650E are instances of block 650 which perform 3×3 convolutions and generate 128 output slices. Block 650D performs ÷2 downsampling to compensate for increased slice depth, while block 650E maintains slice size and number of slices. Another pair of blocks 650F-650G are also instances of block 650, performing 3×3 convolutions and generating 256 output slices. Block 650F can also perform ÷2 downsampling to compensate for increased slice depth, while block 650G maintains slice size and number of slices. The last instances of convolutional block 650 in neural network 620 are blocks 650H-650J, which perform 3×3 convolutions and generate 512 output slices. Block 650H performs ÷2 downsampling to compensate for increased slice depth, while block 650J maintains slice size and number of slices. Block 650J is followed by another ÷2 pooling stage 624. This pooling stage can use an Averaging pooling function, so that the value of each output pixel is the arithmetic mean of four input pixels feeding it.

By design, data reshaping from block 650A through block 624 can modestly reduce the number of degrees of freedom or total data volume of the data arrays flowing through neural network 620. In this illustration, six stages of ÷2 downsampling and a growth from 1 to 512 slices, the total data volume has dropped by a factor of eight.

The output of block 624 can feed a fully connected layer at block 626, which can linearly combine its inputs with respective weights. The output of block 626 can be operated on by activation block 628, which can apply non-linear transformation to generate probability vector 632. Particularly, block 628 can limit its output values to a range [0, 1] as appropriate for probabilities. For a binary classifier, block 628 can be implemented with a sigmoid function, while for three or more classification outputs a soft max function can be used. Probability vector 632 can be normalized so that the sum of its elements equals one.

C. Example Classifiers

In a first illustration, a binary classifier for detecting monocrystalline silicon can output a 2-element probability vector 632, a first element indicating a probability of Yes (monocrystalline Si) and a second element indicating a probability of No (not monocrystalline Si). Another binary classifier can distinguish between monocrystalline Si and polycrystalline Si, with just two output elements P(mono) and P(poly), with P(mono)+P(poly)=1. A third classifier can also distinguish mono-Si and poly-Si but can support a third outcome for Neither, such that P(mono)+P(poly)+ P(neither)=1. A fourth classifier can provide additional outputs, e.g. probabilities of mono-Si, poly-Si, amorphous silicon, a high-Z material, a low-Z material, or "other", in any combination.

Probability vector 632 can be analyzed to determine which index position has the largest value (highest probability), which can be mapped to classification 634 and outputted, ending the image processing.

An exemplary neural network similar to that of FIG. 6 was trained on about 2000 CBED training images to perform binary classification between crystalline and amorphous silicon.

Example Scans

Figure 7:
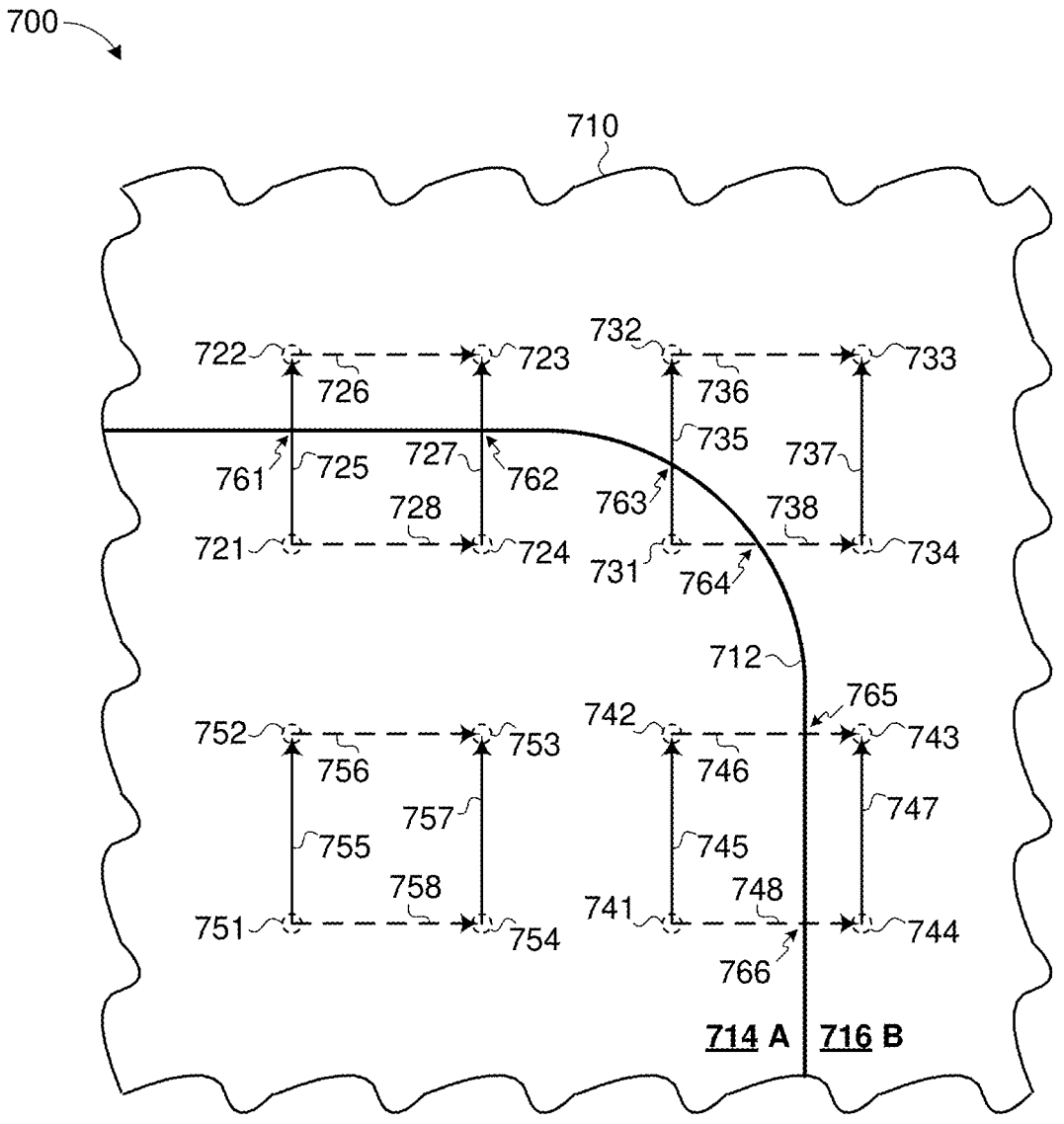
FIG. 7 is a diagram illustrating examples of locating a material boundary using multiple scans according to the disclosed technologies.

FIG. 7 is a diagram 700 illustrating examples of locating a material boundary and determining its orientation, using multiple scans. The illustrated examples include cases of boundaries extending in horizontal, vertical, or oblique directions (as seen in the plane of FIG. 7), as well as following tracing a boundary of complex shape.

FIG. 7 shows a cutaway view of sample 710 in which boundary 712 separates regions 714, 716 having distinct materials A, B which can be distinguished based on reciprocal space representations of image data.

Initially, regions 721-724 form a quadrilateral defining four paths 725-728 over which scans can be performed. A first scan can be performed along path 725, acquiring a succession of images similar to block 410 of FIG. 4. In some examples, the images can be acquired in stepwise fashion. To illustrate, with regions 721, 722 separated by a distance of 2 μm, and a desired accuracy of 100 nm for determining a boundary location, path 725 can be divided into 10 intervals of 200 nm each. A series of images can be acquired in the order 0, 200, 400, 600, . . . nm from region 721 to region 722 along path 725. Reciprocal space images can be classified as they are obtained, or image processing can be deferred until after the scan along path 725 is complete.

In other examples, a binary search can be performed for greater efficiency. To illustrate, reciprocal space images can be obtained at regions 721, 722 and classified. Upon determining that regions 721, 722 have distinct materials and that therefore a boundary lies between regions 721, 722, a third reciprocal space image can be obtained midway between regions 721, 722 to narrow the interval in which the boundary can be found. This interval can be further bisected, iteratively, as described in context of FIG. 3, until coordinate location 761 of boundary 712 along path 725 has been determined to the required accuracy.

Paths 726-728 can be scanned in similar fashion. For path 726, classification of reciprocal images acquired at regions 722, 723 can indicate that both regions have the same material B, from which a determination can be made that boundary 712 does not cross path 726, and the scan of path 726 can be terminated after just these two image points. Path 728 can similarly be found to have no boundary crossing, while path 727 does have a boundary crossing 762 which can be found in similar manner as for path 725.

In this manner, scans along paths 725, 727 can identify a horizontally oriented boundary. Moreover coordinates 761, 762 can be used to establish the orientation of the boundary in cases where boundary 712 has a rotation from the horizontal.

The description next turns to the rectangle formed by regions 731-734, which define paths 735-738. Paths 735, 736 are similar to paths 725, 726, their respective scans leading to coordinate location 763 of boundary 712 crossing path 735, and no boundary crossing along path 736. A scan of path 737 can be found to have a same material B at both endpoints 733, 734, and can be terminated immediately, similar to paths 726, 736. Conversely, material classification at endpoints 731, 734 can reveal dissimilar materials, and a binary search along path 738 can establish coordinate location 764 of boundary 712.

In this manner, scans along paths 735, 738 can identify an obliquely oriented boundary. Moreover coordinates 763, 764 can be used to establish the orientation of boundary 712 passing through these paths.

The description next turns to the square formed by regions 741-744, which define paths 745-748. Paths 748, 747 are similar to paths 738, 737, their respective scans leading to coordinate location 766 of boundary 712 crossing path 748, and no boundary crossing along path 747. A scan of path 745 can be found to have a same material A at both endpoints 741, 742, and can be terminated immediately, similar to paths 726, 747. Conversely, material classification at endpoints 742, 743 can reveal dissimilar materials, and a binary search along path 746 can establish coordinate location 765 of boundary 712.

In this manner, scans along paths 746, 748 can identify a vertically oriented boundary. Moreover coordinates 765, 766 can be used to establish the orientation of boundary 712 passing through these paths.

Turning now to the polygon formed by regions 751-754, an initial reciprocal image classification of vertices 751-754 can indicate that all regions 751-754 have a same material A, indicating that boundary 712 does not pass through this polygon. That is, scan 755 can be terminated after just its endpoints 751-752 have been classified, and similarly for scans 756-758.

Numerous variations and extensions can be implemented within the scope of disclosed technologies. As illustrated, boundary 712 is not straight. As described, multiple scans can be used as described to trace boundary 712 along its coordinate locations 761-766 along respective paths 725, 727, 735, 738, 746, 748. In another aspect, scans in FIG. 7 are shown grouped along sides of a square (e.g. paths 725-728 forming a square), but this is not a requirement. In other examples, any closed polygon can be used. Boundary crossings along any two sides of the polygon can indicate the presence and orientation of the boundary as it passes through the polygon. An error in the reported orientation (angle) can be proportional to the roughness of the boundary.

ADDITIONAL EXAMPLES

The following paragraphs describe additional numbered examples of the disclosed technologies.

Example 1 is an apparatus, including: an imager configured to acquire a plurality of images of respective regions of a sample; and a controller coupled to the imager and configured to: for each of the images: process a reciprocal space representation of the respective image; and responsive to the processing, classify a material within the respective region among a predetermined plurality of materials; and determine a coordinate location of a boundary of a first material of the plurality of materials.

Example 2 includes the subject matter of Example 1, and further specifies that the imager is a reciprocal space imager and each of the acquired images comprises the reciprocal space representation.

Example 3 includes the subject matter of Example 2, and further specifies that the imager is a convergent beam electron diffractometer (CBED).

Example 4 includes the subject matter of any of Examples 1-3, and further specifies that the imager is a microscope and the controller is further configured to, for each of the images, transform the respective image into the reciprocal space representation.

Example 5 includes the subject matter of any of Examples 1-4, and further specifies that the imager is a transmission electron microscope (TEM) or a scanning electron microscope (SEM).

Example 6 includes the subject matter of any of Examples 1-5, and further specifies that the coordinate location is a first coordinate location, and the controller is further configured to cause another image to be acquired at a second coordinate location having a predetermined spatial relationship to the first coordinate location.

Example 7 includes the subject matter of Example 6, and further specifies that the imager is configured to operate in a first imaging modality, and the another image is acquired using a second imaging modality distinct from the first modality.

Example 8 includes the subject matter of any of Examples 1-7, and further specifies that the first material is monocrystalline silicon.

Example 9 includes the subject matter of any of Examples 1-8, and further specifies that the controller is configured to classify the material among any of three or more materials.

Example 10 includes the subject matter of any of Examples 1-9, and further specifies that the classifying is a binary classification distinguishing the first material from other materials.

Example 11 includes the subject matter of any of Examples 1-10, and further specifies that the three or more materials comprise monocrystalline silicon and two or more of: polycrystalline silicon, amorphous silicon, a high-Z material, or a low-Z material.

Example 12 includes the subject matter of any of Examples 1, and further specifies that the controller comprises a trained neural network configured to classify the material.

Example 13 includes the subject matter of any of Examples 1, and further specifies that the coordinate location is determined within a tolerance of 100 nm.

Example 14 is a method, including: acquiring a succession of images comprising reciprocal space representations of respective regions of a sample; for each of the images: classifying the each image to identify a respective material, among a plurality of materials, present within the respective region; and based on the classifying, determining a boundary location of a first material among the plurality of materials.

Example 15 includes the subject matter of Example 14, and further specifies that the succession of images are a first scan over a first predetermined path, the boundary location is a first boundary location, and the method further comprises: repeating the acquiring, classifying, and determining actions for a second scan over a second predetermined path distinct from the first predetermined path, to identify a second boundary location of the first material.

Example 16 includes the subject matter of Example 15, and further includes: determining an orientation of an interface of the first material based on the first and second boundary locations.

Example 17 includes the subject matter of any of Examples 15-16, and further includes: performing additional scans; identifying additional boundary locations from the additional scans; tracing a boundary of the first material based on the first, second, and additional boundary locations.

Example 18 includes the subject matter of any of Examples 14-17, and further specifies that the succession of images comprises three or more images; and wherein the succession of images is acquired by binary search over a predetermined path, in which third and any subsequent images of the images are acquired at a corresponding region that is located, along the predetermined path, in between respective regions of (i) a most recent image of the images and (ii) another preceding image of the images.

Example 19 includes the subject matter of any of Examples 14-18, and further includes: confirming the boundary location by: acquiring two additional images at respective regions along the predetermined path, on opposite sides of the boundary location; and classifying the two additional images; and verifying that exactly one of the two additional images indicates presence of the first material.

Example 20 includes the subject matter of any of Examples 14-19, and further specifies that the classifying is based on detecting: presence or absence of: a moire pattern, or one or more Kikuchi lines; intensity of: a central spot or a halo; or symmetry of one or more features of the each image.

Example 21 includes the subject matter of any of Examples 14-20, and further specifies that the classifying is performed independently for each of the images.

Example 22 includes the subject matter of any of Examples 14-21, and further specifies that the sample comprises a manufactured semiconductor device.

A Generalized Computer Environment

Figure 8:
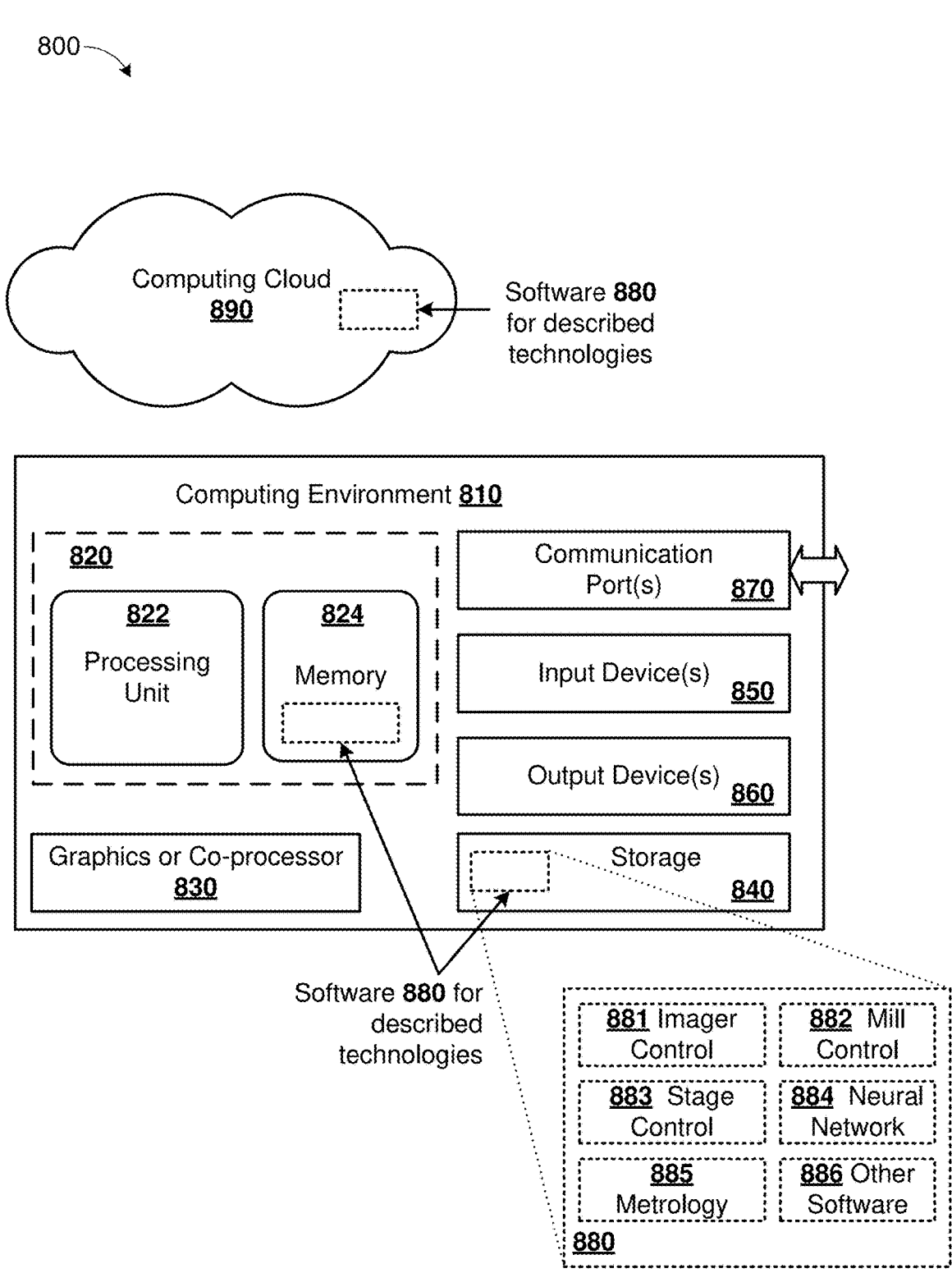
FIG. 8 illustrates a generalized example of a suitable computing environment in which described embodiments, techniques, and technologies pertaining to imaging or milling can be implemented.

FIG. 8 illustrates a generalized example of a suitable computing system 800 in which described examples, techniques, and technologies can be implemented for applying focus stacking to sample preparation or analysis procedures. The computing system 800 is not intended to suggest any limitation as to scope of use or functionality of the present disclosure, as the innovations can be implemented in diverse general-purpose or special-purpose computing systems. The computing system 800 can control a CBED imager, a FIB mill, a microscope, a stage, an analyzer, or other similar equipment; can perform or control image acquisition, image transform, scanning over a sample surface, training or application of a neural network, material classification, metrology, or other analysis on images or other acquired data representative of a sample; can control a stage, ion beam column, or electron beam column; or can acquire, process, output, or store measurement data.

With reference to FIG. 8, the computing environment 810 includes one or more processing units 822 and memory 824. In FIG. 8, this basic configuration 820 is included within a dashed line. Processing unit 822 can execute computer-executable instructions, such as for control, metrology, or other functions as described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. The memory 824 stores software 880 implementing one or more innovations described herein, in the form of computer-executable instructions suitable for execution by the processing unit(s) 822, 830. For example, software 880 can include software 881 for controlling a CBED, SEM, or other imager, software 882 for controlling a FIB or other milling tool, software 883 for controlling a stage on which a sample is supported, software 884 for implementing a trained neural network or other classifier, software 885 for performing metrology or other analysis on sample data, or other software 886 (including user interface, host interface, fault detection, or neural network training). The inset shown for software 880 in storage 840 can be similarly applicable to software 880 elsewhere in FIG. 8. The memory 824 can also store control parameters, calibration data, measurement data, other database data, configuration data, or operational data.

A computing system 810 can have additional features, such as one or more of storage 840, input devices 850, output devices 860, or communication ports 870. An interconnection mechanism (not shown) such as a bus, controller, or network interconnects the components of the computing environment 810. Typically, operating system software (not shown) provides an operating environment for other software 880 executing in the computing environment 810, and coordinates activities of the components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions of the software 880 (including instructions and/or data) implementing one or more innovations described herein. Storage 840 can also store image data, measurement data, workflow programs, reference data, calibration data, configuration data, sample data, or other databases or data structures described herein.

The input device(s) 850 can be a mechanical, touch-sensing, or proximity-sensing input device such as a key-board, mouse, pen, touchscreen, or trackball, a voice input device, a scanning device, or another device that provides input to the computing environment 810. The output device(s) 860 can be a display, printer, speaker, optical disk writer, or another device that provides output from the computing environment 810. Input or output can also be communicated to/from a remote device (e.g. as described in context of FIG. 1) over a network connection, via communication port(s) 870.

The communication port(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

A data acquisition system can be integrated into computing environment 810, either as an input device 850 or coupled to a communication port 870, and can include analog-to-digital converters or connections to an instrumentation bus. An instrumentation control system can be integrated into computing environment 810, either as an output device 860 or coupled to a communication port 870, and can include digital-to-analog converters, switches, or connections to an instrumentation bus.

In some examples, computer system 800 can also include a computing cloud 890 in which instructions implementing all or a portion of the disclosed technology are executed. Any combination of memory 824, storage 840, and computing cloud 890 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Furthermore, as used herein, the terms "or" and "and/or" mean any one item or combination of items in the phrase.

The systems, methods, and apparatus described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. The technologies from any example can be combined with the technologies described in any one or more of the other examples.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "acquire," "activate," "apply," "average," "bisect," "classify," "configure," "control," "convolve," "determine," "downsample," "filter," "generate," "identify," "image," "pool," "process," "produce," "scan," "select," "search," "set," "train," "transform," or "verify" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "maximum," "optimum," "extremum," or the like. It will be appreciated that such descriptions are intended to indicate that a selection among a few or among many alternatives can be made, and such selections need not be lower, better, less, or otherwise preferable to other alternatives not considered.

Theories of operation, scientific principles, or other theoretical descriptions presented herein in reference to the apparatus or methods of this disclosure have been provided to facilitate explanation for the purposes of better understanding and are not intended to be limiting in scope. That is, the disclosed systems, methods, and apparatus are not limited to such theories of operation. The appended claims are not limited to embodiments that function in the manner described by such theories of operation.

Any of the disclosed methods can be controlled by, or implemented as, computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 824, and storage 840. The terms computer-readable media or computer-readable storage media do not include signals and carrier waves. In addition, the terms computer-readable media or computer-readable storage media do not include communication ports (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in Adobe Flash, C, C++, C#, Curl, Dart, Fortran, Java, JavaScript, Julia, Lisp, Matlab, Octave, Perl, Python, Qt, R, Ruby, SAS, SPSS, SQL, WebAssembly, any derivatives thereof, or any other suitable programming language, or, in some examples, markup languages such as HTML or XML, or with any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, side-loaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

In view of the many possible embodiments to which the principles of the disclosed subject matter may be applied, it should be recognized that the illustrated embodiments are only preferred examples and should not be taken as limiting the scope of the claims. Rather, the scope of the claimed subject matter is defined by the following claims. We therefore claim all that comes within the scope and spirit of these claims.

We claim:

1. An apparatus comprising:

an imager configured to acquire a plurality of images of respective regions of a sample; and a controller coupled to the imager and configured to:

for each of the images:

process a reciprocal space representation of the respective image; and responsive to the processing, classify a material within the respective region among any of a predetermined plurality of three or more materials, wherein the three or more materials comprise monocrystalline silicon and two or more of: polycrystalline silicon, amorphous silicon, a high-Z material, or a low-Z material; and determine a coordinate location of a boundary of a first material of the plurality of materials.

2. The apparatus of claim 1, wherein the imager is a reciprocal space imager and each of the acquired images comprises the reciprocal space representation.

3. The apparatus of claim 2, wherein the imager is a convergent beam electron diffractometer (CBED).

4. The apparatus of claim 1, wherein the imager is a microscope and the controller is further configured to, for each of the images, transform the respective image into the reciprocal space representation.

5. The apparatus of claim 1, wherein the imager is a transmission electron microscope (TEM).

6. The apparatus of claim 1, wherein the coordinate location is a first coordinate location, and the controller is further configured to cause another image to be acquired at a second coordinate location having a predetermined spatial relationship to the first coordinate location.

7. The apparatus of claim 6, wherein the imager is configured to operate in a first imaging modality, and the another image is acquired using a second imaging modality distinct from the first modality.

8. The apparatus of claim 1, wherein the controller comprises a trained neural network configured to classify the material.

9. The apparatus of claim 1, wherein the coordinate location is determined within a tolerance of 100 nm.

10. A method comprising:

acquiring a succession of images as a first scan over a first predetermined path, the images comprising reciprocal space representations of respective regions of a sample;

for each of the images:

classifying the each image to identify a respective material, among a plurality of materials, present within the respective region;

based on the classifying, determining a first boundary location of a first material among the plurality of materials; and repeating the acquiring, classifying, and determining actions for a second scan over a second predetermined path distinct from the first predetermined path, to identify a second boundary location of the first material.

11. The method of claim 10, further comprising:

determining an orientation of an interface of the first material based on the first and second boundary locations.

12. The method of claim 10, further comprising:

performing additional scans;

identifying additional boundary locations from the additional scans;

tracing a boundary of the first material based on the first, second, and additional boundary locations.

13. A method comprising:

acquiring, by binary search over a predetermined path, a succession of three or more images comprising reciprocal space representations of respective regions of a sample;

wherein a third image and any subsequent images of the three or more images are acquired at a corresponding region that is located, along the predetermined path, in between the respective regions of (i) a most recent image of the images and (ii) another preceding image of the images;

for each of the three or more images:

classifying the each image to identify a respective material, among a plurality of materials, present within the respective region; and based on the classifying, determining a boundary location of a first material among the plurality of materials.

14. The method of claim 13, further comprising:

confirming the boundary location by:

acquiring two additional images at respective regions along the predetermined path, on opposite sides of the boundary location; and classifying the two additional images; and verifying that exactly one of the two additional images indicates presence of the first material.

15. The method of claim 10, wherein the classifying the each image of the first scan is based on detecting presence or absence of:

a moire pattern, or one or more Kikuchi lines.

16. The method of claim 10, wherein the classifying the each image of the first scan is performed independently for each of the images of the first scan.

17. The method of claim 10, wherein the sample comprises a manufactured semiconductor device.

18. The method of claim 13, wherein the classifying is based on detecting:

presence or absence of: a moire pattern, or one or more Kikuchi lines;

intensity of: a central spot or a halo; or symmetry of one or more features of the each image.

19. The method of claim 13, wherein the classifying is performed independently for each of the three or more images.

20. The method of claim 13, wherein the sample comprises a manufactured semiconductor device.

21. The method of claim 10, wherein the classifying the each image of the first scan is based on detecting intensity of: a central spot or a halo.

22. The method of claim 10, wherein the classifying the each image of the first scan is based on detecting symmetry of one or more features of the each image.

* * * * *